July 5, 1955  L. H. SKROMME ET AL  2,712,388
CONTROL MECHANISM FOR WAGON BOX PUSHER UNLOADER
Filed Aug. 1, 1952  3 Sheets-Sheet 1

INVENTORS
Lawrence H. Skromme
James R. West
By Richard E. Balcock Jr.
ATTORNEY

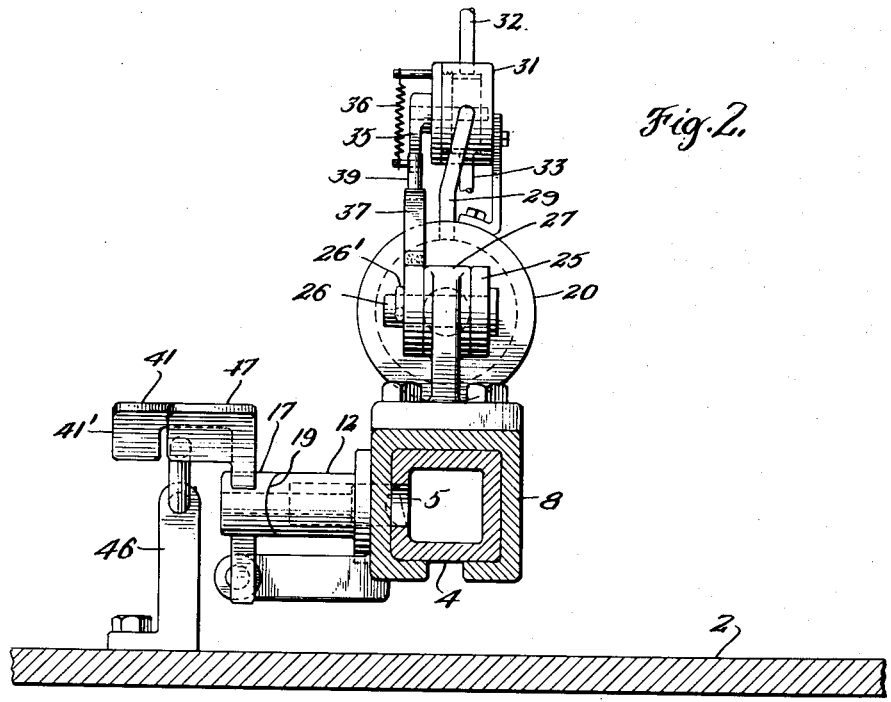
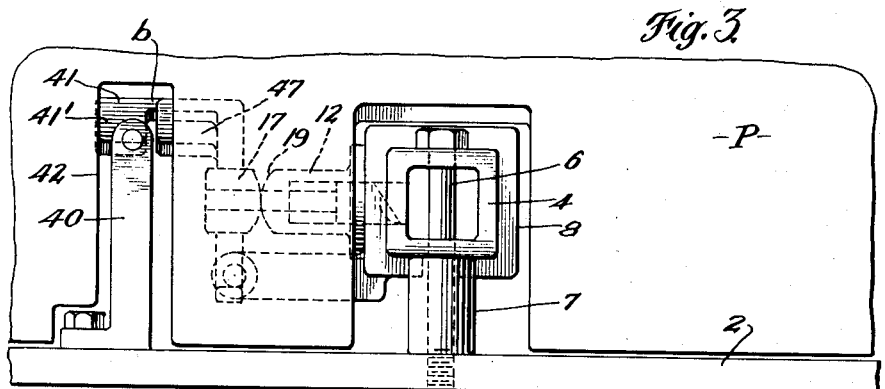
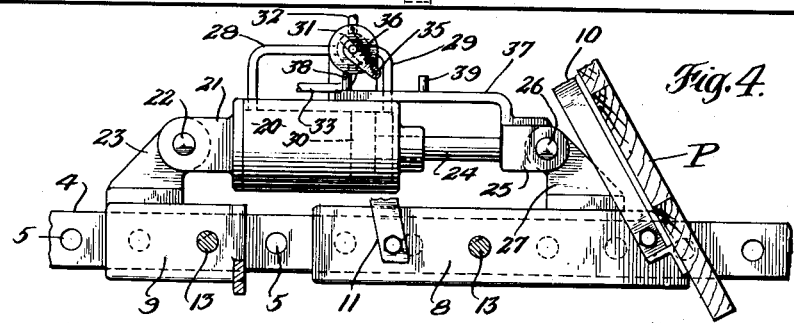

July 5, 1955
L. H. SKROMME ET AL
2,712,388
CONTROL MECHANISM FOR WAGON BOX PUSHER UNLOADER
Filed Aug. 1, 1952
3 Sheets-Sheet 3
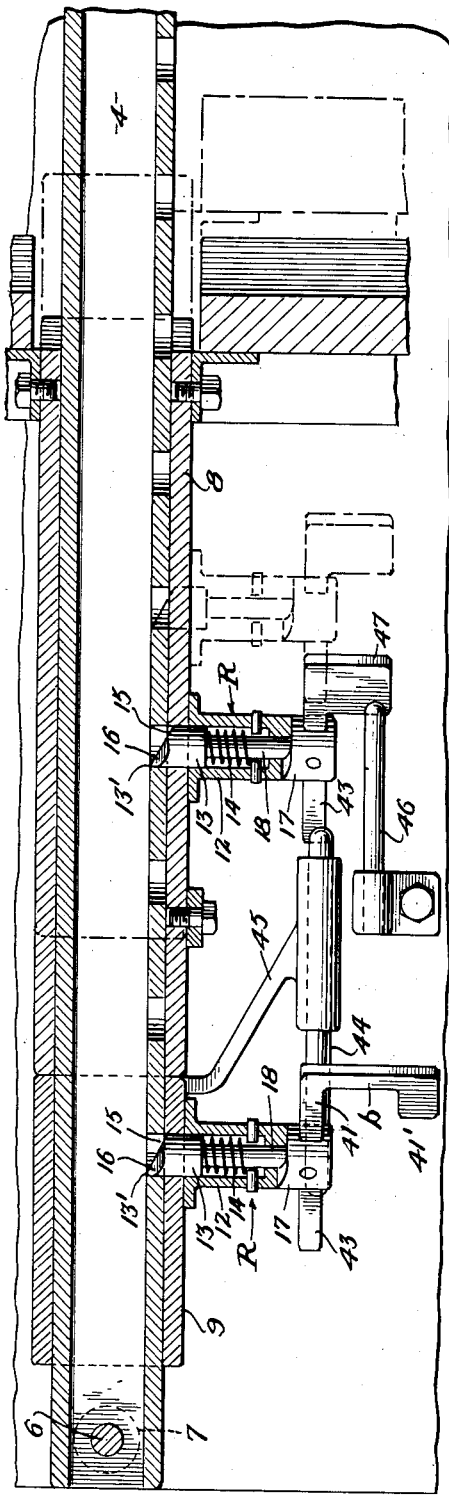
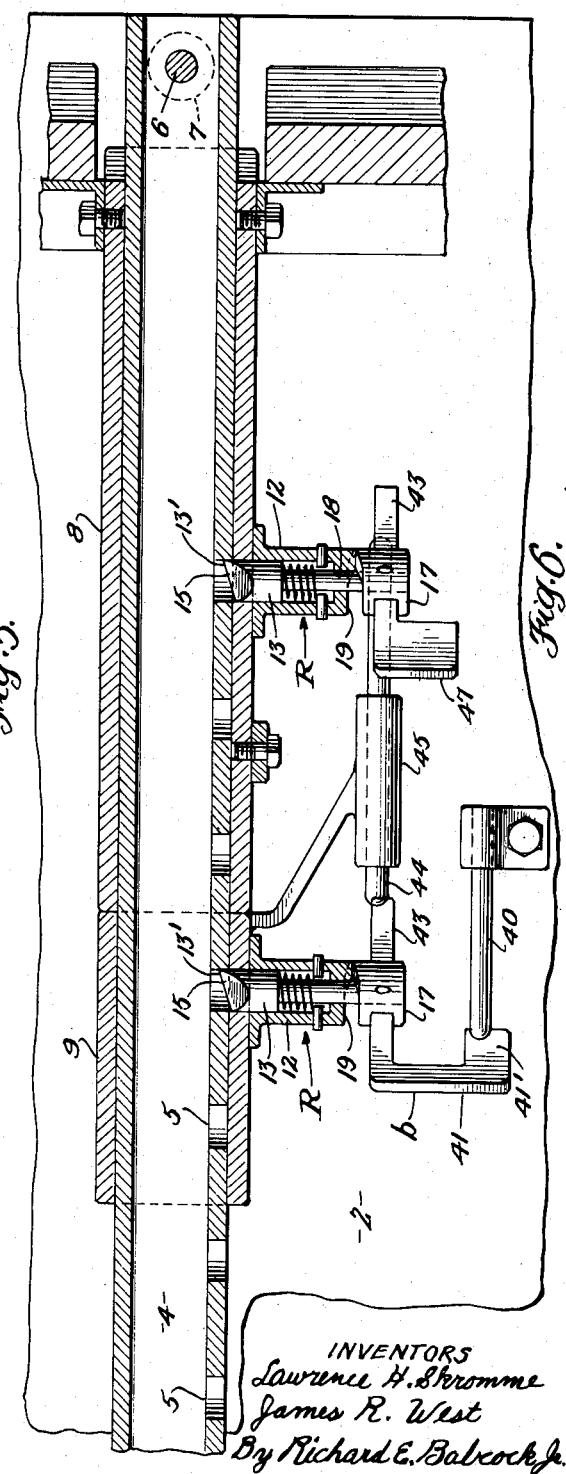
INVENTORS
Lawrence H. Skromme
James R. West
By Richard E. Babcock Jr.
ATTORNEY United States Patent Office 2,712,388
Patented July 5, 1955

2,712,388

CONTROL MECHANISM FOR WAGON BOX PUSHER UNLOADER

Lawrence H. Skromme, near Lancaster, and James Rex West, New Holland, Pa., assignors to New Holland Machine Division of The Sperry Corporation, New Holland, Pa., a corporation of Delaware Application August 1, 1952, Serial No. 302,272

15 Claims. (Cl. 214—82)

This invention relates to wagon or truck body unloaders of the class in which a pusher or false end gate moves endwise of the body to discharge the load through one end thereof, and is directed more particularly to the actuating and control mechanisms for such an unloader.

In the past it has been known to support the pusher on a ratchet slide or carriage which is propelled intermittently along the rack bar or track by power driven extensible and contractible means connecting said slide to a second ratchet slide, similarly movable along the bar, and alternately drawing said slides together and forcing them apart so that the alternate engagement of their respective ratchet means with the bar will cause both slides to move in alternate steps along the bar, each slide in turn providing a fixed connection between the bar and the power drive means while said means acts to move the other slide. The power drive means may comprise a double acting hydraulic cylinder and piston controlled by a reversing valve so that the fluid pressure within the cylinder may be utilized to cause both projection and retraction of the piston and piston rod.

The primary objects of the instant invention are:

To improve on a wagon unloading mechanism of the type aforementioned by providing novel means for automatically actuating the reversing valve at the end of each piston stroke, to thereby cause continuous reciprocation of the piston;

To provide a novel reversible ratchet or detent mechanism for the slide, adapted to interengage the guiding rack bar or track in such manner as to cause movement of the slide in either direction along the track; and To provide a novel mechanism for automatically reversing the respective detent mechanisms at the time the slides and pusher reach the end of their unloading movement through the wagon body, so that the reciprocating actuating means will then return the pusher to its starting position. The invention also envisions the provision of further means for again automatically reversing the detents as the pusher reaches its starting position, to thus place the mechanism in readiness for a further unloading movement.

A farm wagon equipped with such an unloader may be towed by a usual farm tractor equipped with a conventional hydraulic system. Power for actuation of the hydraulic cylinder and piston unit may be derived from the tractor hydraulic system and in fact the said cylinder and piston unit may conveniently comprise the conventional hydraulic unit with which many such tractors are provided as standard equipment.

By virtue of the several improved features of the instant invention it will be apparent that the entire unloading operation may be controlled solely by the tractor driver through the control valve of the tractor hydraulic system, without alighting from the tractor and if desired without stopping the tractor.

The objects and advantages above enumerated as well as other incidental objects and advantages hereinafter appearing, are all attained by the preferred embodiment of the invention illustrated in the accompanying drawings in which:

Figure 2 is an enlarged cross-sectional view taken substantially on the line 2—2 of Figure 1;

Figure 1:
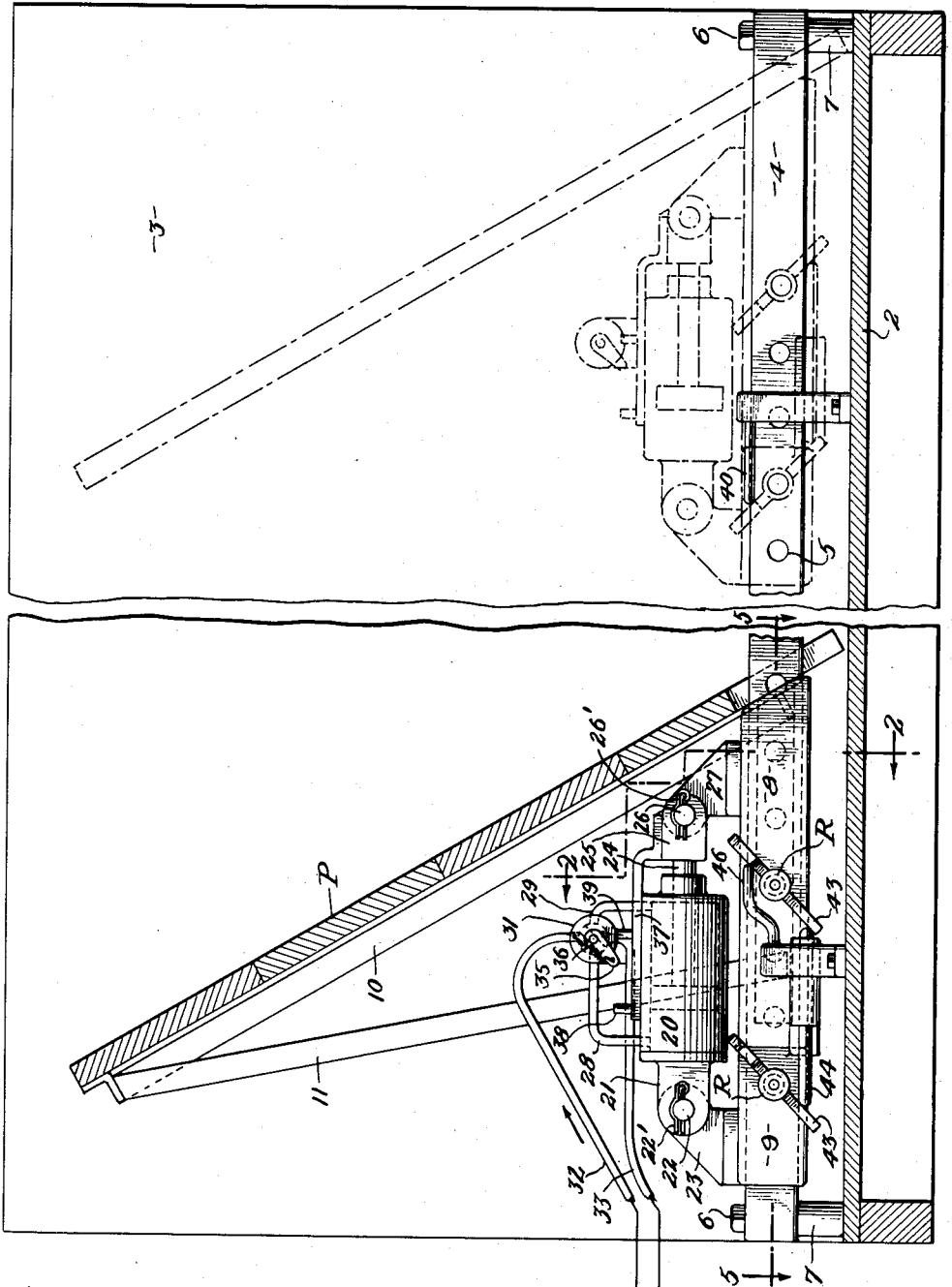
Figure 1 represents a sectional elevational view of an automatic wagon unloader partly broken away to condense the figure and indicating a control valve diagrammatically which may be located on a propelling tractor or the like, and showing the automatic unloading unit in the position of starting unloading in full lines and in its position of finishing unloading in dot and dash lines.

Figure 3, a fragmentary end view looking toward the left as seen in Figure 1;

Figure 4, a fragmentary sectional elevational view showing the movable end gate or pusher in the position it assumes when the piston of the unit has been moved to the right by fluid pressure;

Figure 5, a plan section on an enlarged scale taken substantially along the line 5—5 of Figure 1, showing the detents or pawls in the positions they assume when the pusher is being moved in an unloading direction; and Figure 6, a plan section showing the pusher at the end of its unloading movement with the respective detents or pawls in the positions they assume in the return movement of the pusher.

Referring now in detail to the accompanying drawings, and first considering Figure 1, there is shown the load carrying body of a vehicle such as a farm wagon. This body comprises a horizontal bottom 2 and opposed parallel sides 3 of which only 1 is shown, though the arrangement which is entirely conventional will be readily understood.

A guide track or rail 4 extends lengthwise of the body and preferably medially between its sides 3. Such a track is of tubular rigid metal construction of generally rectangular cross-sectional shape in the present instance, and is supported at its ends by the bolts and spacers 6 and 7 respectively in spaced relation above the bottom 2 of the body. In order that this track or rail 4 may function as a rack bar it is provided at uniform intervals throughout its length with a plurality of transverse recesses or perforations 5 extending through one side thereof.

A pair of slides or carriages 8 and 9 respectively are movable on the track 4 between its ends. Preferably both of these slides 8 and 9 are in the form of split metal sleeves of a rectangular cross-section conforming generally to that of track 4, as illustrated in Figure 2.

A movable end gate or pusher P is connected to and preferably carried by one of the slides 8 for movement therewith. Such a pusher may comprise a series of boards or planks secured on the rearwardly inclined rigid rectangular frame work 10 which in turn is secured to the slide 8 and braced by members 11 against rearward deflection.

Reversible ratchet or pawl means carried by the respective slides for limiting these to movement along the track 4 in one direction only are similarly mounted on their respective slides. Each such detent 13 is of cylindrical shape and is guided for both axial and rotary movement in the cylindrical bore of a sleeve or housing 12 on its respective slide. It will be seen that the bore of each sleeve 12 opens through the side of its respective slide 8—9 so that the detents 13 may project into the various perforations or recesses 5 along the track 4. Each detent 13 is resiliently projected into operative engagement with the bar 4 by compression spring 14 within its housing 12, to thus either automatically project in to such recesses 5 as may register therewith or to resiliently thrust against and ride along the side of the track during the movement of the pawls between recesses 5.

The free end of each detent 13 is formed with a pair of intersecting cam surfaces 15 and 16 respectively sloped or inclined to the cylindrical axis of the detent in planes parallel to said axis and at right angles to each other, so that both cam surfaces slope away from the operative tip or apex 13' constituting the point of maximum axial projection of the detent. The cylindrical side of this tip 13' is thus disposed to abut against the side of its cooperating recess 5 to prevent movement in one longitudinal direction. The extent of projection of the detent 13 into the recesses 5 is controlled by cam 17 fixed on the end of the detent 18 and having a cam surface cooperating with another cam surface 19 (Figure 6) on the adjacent end of the housing or sleeve 12.

The arrangement is such that when the detents or pawls 13 are rotated in their housings to the position shown in Figure 5, to permit unloading movement of their respective slides 8 and 9 and the pusher P, the cam elements 18 and 19 permit insertion of the detents in their respective recesses 5 sufficiently to interlock therewith against movement in one direction, while permitting the inclined cam surfaces 15 to project from the recesses 5 in an unloading direction. As thus positioned the detents 13 may ride out of the recesses 5 responsive to unloading movement (to the right on Figure 5) of their respective slides 8 and 9.

However, when the detents 13 are rotated at right angles to their unloading position of Figure 5, to the position shown in Figure 6, they will permit return movement of the slides 8 and 9 and the pusher 10, which movement will be to the left as seen in Figure 6. During rotation of the detents to this position their respective cam elements 18 and 19 coact to slightly retract the detents 13 from their respective recesses 5 so that the leading edge of each of the cam surfaces 16 will project slightly from these recesses to ride out of same during return movement of the slides 8 and 9, but nevertheless the detents 13 will operatively engage the side walls of their respective recesses 5 to prevent unloading movement.

While the cam surfaces 15 and 16 could be formed of the same depth or axial extent, to render unnecessary the axial adjustment of the pawls or detents as these are reversed, this would result in leaving a smaller operative cylindrical surface on the pawl tips 13' for abutting engagement with the side walls of the recesses 5. It is desirable that such area be as large as is possible or practicable during the unloading movement of the pusher in order that the interconnection between the said detents 13 and the track 4 may be as strong as possible to withstand the stresses imposed on them responsive to unloading movement of the respective slides and pusher. However, the return movement of the pusher is unopposed and thus the lesser area of engagement offered by the pawls in their partially retracted position of Figure 6 will easily suffice for this. Hence, illustrated arrangement though not essential is preferred.

For the purpose of propelling the slides and pusher along the track 4 there is provided a double acting extensible and retractible jack, which may conveniently comprise the standard hydraulic unit of the tractor which tows the wagon.

The cylinder 20 of this unit is provided at one end with a clevis 21 which is pivotally connected by pin 22 onto a suitable bracket 23 secured on the slide or carriage 9. Similarly the exterior end of the piston rod 24 of such unit terminates in a clevis 25 which is pivotally connected as at 26 to a bracket 27 fixed on the pusher slide 8. The respective pivot pins 22 and 26 are preferably removably held in place by easily removable cotter pins 22' and 26' respectively (Figure 1) so that the unit 20—24 may be readily removed and reapplied to the tractor or other mechanism.

Fluid conduits 28, 29 communicating with the interior of the cylinder 20 on opposite sides of the piston 30 are connected to and receive fluid under pressure through a reversing valve 31, shown in Figures 1 and 4, which in turn has fluid circulated thereto through supply and exhaust conduits 32 and 33 from a master control valve 34 communicating with the hydraulic system of the tractor or other suitable source of fluid under pressure.

Valve 31, which may comprise any conventional type of rotary reversing valve, is automatically reversed at the end of each stroke of the piston 30, to thus reverse the piston movement automatically and cause a continuous reciprocating movement of the piston.

To this end a toggle control arm 35 is fixed to the rotary valve core or rotor radially to its rotational axis, the arrangement being such that swinging of the valve core and control arm 35 from the position of Figure 1 to the position of Figure 4 will reverse the flow of fluid through the conduits 28—29. A tension spring 36 is arranged to snap the arm 35 toward and retain it in either of its operative positions as it is moved past center toward either of said positions.

For the purpose of actuating the toggle arm 35 at proper times, the piston rod 24 carries a bar 37 which extends parallel to the rod exteriorly of cylinder 20. At spaced intervals on this bar are disposed studs or bosses 38 and 39. The stud 38 is positioned to abut against the arm 35 and swing it past dead center position to reverse the valve as the piston 30 approaches the end of its outward or unloading stroke as in Figure 4. Stud 39 is positioned to engage the arm 35 and swing it past dead center to reverse the valve 31 as the piston 30 approaches the end of its return or retraction stroke, as in Figure 1.

It will be apparent that the constant reciprocation of the piston 30 in cylinder 20 will alternately spread apart and draw together the slides 8 and 9. Thus with the pawls or detents 13—13 of the respective slides both set in the same direction, for instance as shown in Figures 1 and 5, to prevent return movement of their respective slides, it will be seen that on the outward piston stroke the slide 9 will be held stationary by its detent 13, while the slide 8 will be moved along track 4 to withdraw its detent from the recess 5 which then receives it and moves same along until it snaps into another recess 5 at the end of the outward piston stroke. Then as the piston 30 is retracted, the pusher slide 8 will be held fast by its detent 13 while the slide 9 is drawn up to it, at which time the detent 13 of slide 9 will engage in a new recess 5 preparatory to the next outward stroke of the piston. Thus the pusher P will be caused to move intermittently along the track 4 in an unloading direction until it reaches the rear or discharge end of the wagon box or body as illustrated in broken lines in Figure 1.

In order to reverse the detents 13—13 to automatically institute return movement of the pusher P, a stop 40 fixed on the bottom 2 of the wagon box (Figures 3 and 6) is positioned to engage a radial control arm 41 fixed on the stem of the detent of slide 9 to swing said arm 41 and detent through an arc of 90° and thereby reverse the detent as shown in Figure 6. It will be noted in Figure 3 that the pusher P is provided with a notch 42 in its lower edge whereby it may pass freely over the stop 40.

Such reversal is caused as the slide 9 with its detent 13, is drawn up toward the pusher slide 8. In order to transmit such reversal movement to the detent 13 of the pusher slide 8, both detents 13 are provided with depending radial arms 43 and a floating rod 44 guided in a bracket 45 on the slide 9 for endwise sliding movement between these arms 43 is urged by the arm 43 of the slide 9 against the arm 43 of slide 8 to swing the last mentioned arm and rotate its detent 13 to reverse position.

Thus when both detents 13 are reversed, as in Figure 6, the slides 8 and 9 and pusher P will automatically be caused to commence their return movement under actuation of the reciprocating piston 30. The action of the slides and their detents 13 on the return movement will be similar but reverse to that taking place on the unloading movement.

A stop 46 fixed on the bottom 2 of the wagon box (see Figures 2 and 5) is positioned to engage radial control arm 47 on the detent of slide 8 as the slides 8 and 9 are returned to starting position. Resetting of the detent 13 of slide 8 is caused by such engagement during the return of slide 8 to its starting position, and such resetting is transmitted to the detent 13 of slide 9 through the interconnection between said detents provided by the sliding rod 44 and their respective depending arms 43—43.

At this time the master valve 34 on the tractor may be actuated to discontinue the flow of fluid to the reversing valve 31 and cylinder 20 so that the pusher P will remain stationary as the wagon is again loaded.

It will be noted that the stop 40 is disposed out of the path of the control arm 47 of slide 8, and that as shown in Figure 6 the operative free end 41' of the detent control arm 41 is connected by a bridge portion b in laterally off-set relation to the main portion of arm 41 to be disposed for engagement with stop 40. Thus the free end portion 41' of arm 41 is disposed for movement out of alignment with the stop 46 which cooperates with arm 47, and the connecting bridge b is disposed to pass over and clear the stop 47 without engaging it.

A summary of the operation of the invention is as follows:

With the pusher P held stationary in the position of Figure 1, due to the closing of the master valve 34, a wagon may be loaded with ensilage or other material which may then be transported to any suitable destination. In order to discharge the load, the master valve is manipulated to supply fluid under pressure from the tractor hydraulic system through the automatically reversing valve 31 to the cylinder 20.

Interengagement of the bosses or studs 38 and 39 with the toggle control arm 35 of the reversing valve 31 automatically reverse said valve at the end of each piston stroke to thus cause a constant reciprocation of the piston 20. This results in alternately separating and drawing together the slides 8 and 9 and, through the interengagement between their respective detents 13 and the track 4, causes an intermittent progression of the respective slides 8 and 9 and the pusher P in an unloading direction toward the position indicated in broken lines in Figure 1.

As the pusher approaches the end of its unloading movement, the interengagement between the stop 40 and detent control arm 41 causes a reversal of both interconnected detents 13—13, whereby continued reciprocation of the piston 30 in cylinder 20 causes a return movement of the slide and pusher P to their starting point of Figure 1.

Upon reaching this starting point, the interengagement between the stop 46 and detent control arm 47 causes a further reversal or resetting of the detents 13—13 for a further advance or unloading stroke, at which time the master valve 13 is preferably actuated to discontinue the movement of the pusher while the wagon is reloaded or transported.

Due to the automatic reversing valve 31 and the automatic direction reversing means for the pusher, consisting of the novel arrangement of detents, control arms and stops above described, it will be apparent that the invention may be operated and controlled by the tractor driver alone without any assistance, and that he is not at any time required to dismount from the tractor for the purpose of controlling the unloading operation.

Moreover, since the unloading mechanism may be driven directly from the hydraulic system of the tractor, the invention is especially useful in filling trench silos, due to the fact that the unloading may proceed as the tractor and wagon are driven through the trench.

In this application, we show and describe only the preferred embodiment of our invention, simply by way of illustration of its practice as by law required. However, we recognize that our invention is capable of other and different embodiments and that its several details may be modified in various ways all without departing from the invention. Accordingly, the drawings and description herein are to be considered as merely illustrative in nature and not as exclusive.

Having thus described our invention, we claim:

1. A wagon unloader comprising a rack bar, a pair of slides guided for movement along said bar, extensible and contractible means connected between said slides to alternately move same toward and away from each other, pawls carried by the respective slides for operative engagement with said bar in the same direction, each said pawl being supported by its respective slide for rotary reversing movement about an axis generally perpendicular to said bar and having a free end in operative engagement with said bar, said end being formed with a pair of adjoining cam surfaces sloping away from said free end, in planes angularly displaced from each other around said axis by 90°, whereby rotation of the pawl through 90° may reverse the direction of operation of said pawl, means interconnecting said pawls for simultaneous reversal, a radial control arm carried by one of said pawls, a stop and means supporting same in the path of movement of said control arm, whereby movement of the slide carrying said arm into engagement with said stop will swing said arm through 90° and reverse said interconnected pawls to institute reverse movement of said slides.

2. A wagon unloader comprising a rack bar, a pair of slides guided for movement along said bar, extensible and contractible means connected between said slides to alternately move same toward and away from each other, pawls carried by the respective slides for operative engagement with said bar in the same direction, each said pawl being supported by its respective slide for rotary reversing movement about an axis generally perpendicular to said bar and having a free end in operative engagement with said bar, said end being formed with a pair of adjoining cam surfaces sloping away from said free end, in planes angularly displaced from each other around said axis by at least 90° whereby rotation of the detent in an amount equal to such angular displacement may reverse the direction of operation of said pawl, means interconnecting said pawls for simultaneous reversal, a radial control arm carried by each of said pawls, stops for the respective control arms and means supporting said stops in the path of movement of the respective control arms, whereby movement of either of said arms into engagement with its respective stop will reverse both of said interconnected pawls.

3. A wagon unloader comprising a rack bar, a pair of slides guided for movement along said bar, extensible and contractible means connected between said slides to alternately separate and draw together said slides, pawls carried by the respective slides for operative engagement with said bar in the same direction, each said pawl being supported by its respective slide for rotary reversing movement about an axis generally perpendicular to said bar, control means carried by the respective pawls in laterally offset relation for movement in different longitudinal paths, and rotatable with said respective pawls to reverse the positions thereof, means interconnecting said pawls for simultaneous reversal, means supported in said different longitudinal paths adjacent opposite ends of said bar for operative reversing engagement with the respective control means.

4. A wagon unloader comprising a rack bar, a pair of slides guided for movement along said bar, extensible and contractible means connected between said slides and operative to alternately separate and draw together said slides, pawls carried by the respective slides for operative engagement with said bar in the same direction, each said pawl being supported by its respective slide for rotary reversing movement about an axis generally perpendicular to said bar, control means carried by one of said pawls and rotatable therewith to reverse the position of said pawl, means interconnecting said pawls for simultaneous reversal, and means positioned in the path of movement of said control means for operative reversing engagement therewith at a predetermined point in the movement of said slides.

5. A wagon unloader comprising a rack bar, a pair of slides guided for movement along said bar, extensible and contractible means connected between said slides and operative to alternately separate and draw together such slides, pawls carried by the respective slides for operative engagement with said bar in the same direction, each said pawl being supported by its respective slide for rotary reversing movement, control means carried by the respective pawls in laterally offset relation for movement with their respective slides in different longitudinal paths, said control means being rotatable with their respective pawls to reverse the operative positions of said pawls, and means positioned in said respective different paths for operative actuating engagement with the respective control means.

6. A wagon unloader comprising a rack track, a pair of slides guided for movement along said track, power means connected between said slides for alternately separating and drawing same together, reversible pawls carried by the respective slides for operative engagement with said track, said pawls being normally set to permit movement of both slides in the same direction, control means carried by the respective pawls for movement in different paths parallel to said track, said control means being movable relative to their respective slides to reverse the respective pawls, and means positioned in said respective different paths for operative actuating engagement with the respective control means as the latter move along the track with their slides.

7. A wagon unloader comprising a rack track, a pair of slides guided for movement along said track, power means connected between said slides for alternately separating and drawing same together, reversible pawls carried by the respective slides for operative engagement with said track, said pawls being normally set to permit movement of both slides in the same direction, control means carried by each of said pawls for movement parallel to said track to reverse their respective pawls, and means positioned for operative actuating engagement with said respective control means as the latter move along the track with their respective slides.

8. A wagon unloader comprising a rack track, a slide guided for movement along said track, means alternately urging said slide in opposite directions along said track, a reversible pawl carried by said slide in operative engagement with said track to permit movement of said slide in only on direction along the track, control means carried by said pawl for movement therewith, said control means being movable to reverse said pawl, and means positioned adjacent said track for engagement with said control means to move same and reverse said pawl as the slide reaches a predetermined point along said track.

9. A wagon unloader comprising a rack track, a pair of slides guided for movement along said track, power means connected between said slides for alternately separating and drawing said slides together, reversible pawls carried by the respective slides for operative engagement with said track, said pawls being normally set to permit movement of both slides in the same direction, control means operatively connected with one of said pawls and movable relative to its respective slide to cause reversal of said pawl, means interconnecting said pawls for simultaneous reversal, and means positioned for operative engagement with said control means during movement of its slide along the track, to reverse the positions of both said pawls and initiate reverse movement of said slides.

10. A wagon unloader comprising a rack track, a pair of slides guided for movement along said track, power means associated with said slides for alternately separating and drawing same toward each other, reversible pawls carried by the respective slides for operative engagement with said track, said pawls being normally set to permit movement of both slides in the same direction, control means operatively connected with one said pawl and movable relative to its respective slide to cause reversal of said pawl, means interconnecting said pawls for simultaneous reversal, and means for engaging said control means and reversing said pawl at a predetermined position of movement along said track.

11. A wagon unloader comprising a rack track, a pair of slides guided for movement along said track, pawls carried by the respective slides for operative engagement with said track, said pawls being disposed to permit movement of both slides in the same direction along said track, in combination with a hydraulic cylinder connected to one of said slides, a piston reciprocable in said cylinder and connected to the other of said slides, whereby reciprocation of said piston will alternately move said slides toward and away from each other, a reversing valve adapted to receive fluid under pressure, said valve being in communication with the opposite ends of said cylinder whereby said valve may be actuated to cause movement of said piston in either direction, a control means for said valve movable through a dead center position to either of two operative positions in which the flow of fluid from said valve to the cylinder is relatively reversed, in combination with means movable with said piston for operatively engaging said control means and reversing said valve at the end of each piston stroke.

12. A wagon unloader comprising a rack track, a pair of slides guided for movement along said track, pawls carried by the respective slides for operative engagement with said track, said pawls being disposed to permit movement of both slides in the same direction along the track, in combination with a hydraulic cylinder connected to one of said slides, a piston reciprocable in said cylinder being connected to the other of said slides, whereby reciprocation of said piston will alternately move said slides toward and away from each other, a reversing valve carried by said cylinder, said valve being in communication with the opposite ends of said cylinder whereby the valve may be actuated to cause movement of the piston in either direction, a control means for said valve movable generally parallel to the movement of said cylinder into either of two operative positions in which the flow of fluid from the valve to the cylinder is relatively reversed, in combination with means movable with said piston for operatively engaging said control means and reversing said valve at the end of each piston stroke.

13. A wagon unloader comprising a rack track, a pair of slides guided for movement along said track, pawls carried by the respective slides for operative engagement with said track, said pawls being disposed to permit movement of both slides in the same direction along said track, in combination with a hydraulic cylinder member connected to one of said slides, a piston member reciprocable in said cylinder member and connected to the other of said slides, whereby reciprocation of said piston member will alternately move said slides toward and away from each other, a reversing valve disposed for movement with one of said members, said valve being in communication with the opposite ends of said cylinder member, whereby said valve may be actuated to cause movement of the piston member in either direction, a control means carried by said valve for movement generally parallel to the relative movement of said members to either of two operative positions in which the flow of fluid from said valve to the cylinder member is relatively reversed, in combination with means movable with the other of said members for operatively engaging said control means and reversing said valve at the end of each piston member stroke.

14. A wagon unloader comprising a rack track, a pair of slides guided for movement along said track, pawls carried by the respective slides for operative engagement with said track, said pawls being disposed to permit movement of both slides in the same direction along said track, in combination with a hydraulic cylinder connected to one of said slides, a piston reciprocable in said cylinder and connected to the other of said slides, whereby reciprocation of said piston will alternately move said slides toward and away from each other, a reversing valve disposed for movement with one of said slides, said valve being in communication with the opposite ends of said cylinder whereby said valve may be actuated to cause movement of said piston in either direction, a control means carried by said valve for movement to either of two operative positions in which the flow of fluid from said valve to the cylinder is relatively reversed, in combination with means movable with the other of said slides for operatively engaging said control means and reversing said valve at the end of each piston stroke.

15. A wagon unloader comprising a track, a pair of slides guided for movement along said track, means associated with the respective slides for permitting movement thereof in only one direction along said track, in combination with a hydraulic cylinder connected to one of said slides, a piston reciprocable in said cylinder and connected to the other of said slides, a reversing valve disposed for movement with one of said slides, said valve being in communication with the opposite ends of said cylinder whereby said valve may be actuated to cause movement of said piston in either direction, a control means carried by said valve for movement to either of two operative positions in which the flow of fluid from said valve to the cylinder is relatively reversed, in combination with means movable with the other of said slides for operatively engaging said control means and reversing said valve at the end of each piston stroke.

References Cited in the file of this patent

UNITED STATES PATENTS

| | | |
|---|---|---|
| 1,946,452 | Bridges | Feb. 6, 1934 |
| 1,962,228 | Abramson et al. | June 12, 1934 |
| 2,258,988 | Le Laurin | Oct. 14, 1941 |
| 2,339,360 | Sicard | Jan. 18, 1944 |
| 2,365,771 | Olson | Dec. 26, 1944 |
| 2,480,527 | Wachter | Aug. 30, 1949 |
| 2,529,777 | McInnis | Nov. 14, 1950 |
| 2,561,755 | Recker | July 24, 1951 |
| 2,607,324 | Mead | Aug. 19, 1952 |
| 2,657,009 | Neis et al. | Oct. 27, 1953 |
| 2,669,366 | Sievers | Feb. 16, 1954 |